(12) United States Patent
Roll et al.

(10) Patent No.: US 10,062,117 B2
(45) Date of Patent: Aug. 28, 2018

(54) PROVIDING LOAN SERVICES IN THE EVENT OF A TOTAL LOSS CLAIM

(75) Inventors: Leif A. Roll, Bloomington, IL (US); Jun Wu, Bloomington, IL (US); John F. Johnson, Bloomington, IL (US); Kimberly D. Leigh, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 257 days.

(21) Appl. No.: 13/489,597

(22) Filed: Jun. 6, 2012

(65) Prior Publication Data

US 2013/0332334 A1 Dec. 12, 2013

(51) Int. Cl.
| G06Q 40/00 | (2012.01) |
| G06Q 40/02 | (2012.01) |
| G06Q 40/06 | (2012.01) |
| G06Q 40/08 | (2012.01) |

(52) U.S. Cl.
CPC .................... *G06Q 40/08* (2013.01)

(58) Field of Classification Search
CPC ......... G06Q 40/00; G06Q 40/02; G06Q 40/06
USPC ...................................................... 705/38, 4
See application file for complete search history.

(56) References Cited

U.S. PATENT DOCUMENTS

| 6,587,841 | B1 | 7/2003 | Defrancesco et al. | 705/38 |
| 6,898,574 | B1 * | 5/2005 | Regan | 705/38 |
| 7,181,427 | B1 | 2/2007 | Defrancesco et al. | 705/38 |
| 7,801,807 | B2 | 9/2010 | Defrancesco et al. | 705/38 |
| 7,814,002 | B2 | 10/2010 | Defrancesco et al. | 705/38 |
| 8,266,050 | B2 * | 9/2012 | Chheda et al. | 705/38 |
| 8,271,364 | B2 * | 9/2012 | Nobili et al. | 705/35 |
| 8,510,199 | B1 | 8/2013 | Erlanger | 705/36 R |
| 8,788,406 | B2 | 7/2014 | Roll et al. | 705/38 |
| 2004/0019507 | A1 * | 1/2004 | Yaruss et al. | 705/4 |
| 2004/0019508 | A1 * | 1/2004 | Yaruss et al. | 705/4 |
| 2004/0019544 | A1 * | 1/2004 | Yaruss et al. | 705/35 |
| 2004/0019557 | A1 * | 1/2004 | Yaruss et al. | 705/38 |
| 2004/0078320 | A1 | 4/2004 | Defrancesco et al. | 705/38 |
| 2004/0138992 | A1 | 7/2004 | Defrancesco et al. | 705/38 |
| 2004/0138993 | A1 | 7/2004 | Defrancesco et al. | 705/38 |
| 2004/0138994 | A1 | 7/2004 | Defrancesco et al. | 705/38 |
| 2004/0138997 | A1 | 7/2004 | Defrancesco et al. | 705/38 |
| 2005/0125334 | A1 | 6/2005 | Masella et al. | 705/38 |
| 2005/0222947 | A1 * | 10/2005 | Regan | 705/39 |
| 2006/0282359 | A1 * | 12/2006 | Nobili et al. | 705/35 |

(Continued)

OTHER PUBLICATIONS

"The Case for Comprehensive Disaster Insurance," by Howard Kunreuther, University of Chicago. HeinOnline, 11 J.L. & Econ, 1968. pp. 133-164.*

*Primary Examiner* — Sara C Hamilton
(74) *Attorney, Agent, or Firm* — Slayden Grubert Beard PLLC

(57) ABSTRACT

Providing a property replacement loan offer to a customer that has lost property in a total loss event where the offer is provided automatically in response to an indication of the total loss event. The invention includes computer-based processes that collect customer-specific data for the customer whose property is involved in the total loss event and using this data to prequalify the customer for the property replacement loan. The processing includes accessing a credit bureau to receive data related to the customer's credit.

7 Claims, 6 Drawing Sheets

(56) References Cited

U.S. PATENT DOCUMENTS

| | | | |
|---|---|---|---|
| 2006/0287895 A1* | 12/2006 | Salas | 705/4 |
| 2007/0112670 A1 | 5/2007 | Defrancesco et al. | 705/38 |
| 2007/0136109 A1* | 6/2007 | Yager et al. | 705/4 |
| 2007/0168278 A1* | 7/2007 | Peterson et al. | 705/38 |
| 2007/0282735 A1* | 12/2007 | Schuebert | 705/38 |
| 2007/0288359 A1* | 12/2007 | Amadio et al. | 705/38 |
| 2008/0077448 A1* | 3/2008 | Diamond | 705/4 |
| 2008/0183515 A1* | 7/2008 | Chheda et al. | 705/7 |
| 2009/0048944 A1* | 2/2009 | Eagle | 705/27 |
| 2009/0112634 A1* | 4/2009 | Koziol | 705/4 |
| 2009/0182661 A1* | 7/2009 | Irwin | 705/38 |
| 2009/0216565 A1* | 8/2009 | Opyd, III | 705/4 |
| 2009/0216591 A1* | 8/2009 | Buerger et al. | 705/7 |
| 2009/0254487 A1* | 10/2009 | Dhar et al. | 705/80 |
| 2009/0299911 A1* | 12/2009 | Abrahams et al. | 705/36 R |
| 2010/0042520 A1 | 2/2010 | Rose et al. | 705/30 |
| 2010/0042534 A1 | 2/2010 | Moran | 705/38 |
| 2010/0082477 A1* | 4/2010 | Huston et al. | 705/38 |
| 2010/0094749 A1* | 4/2010 | Peterson et al. | 705/38 |
| 2010/0114612 A1* | 5/2010 | Stanton | 705/4 |
| 2010/0306108 A1* | 12/2010 | Bierer et al. | 705/44 |
| 2011/0112960 A1* | 5/2011 | Lazerson | 705/38 |
| 2011/0213641 A1* | 9/2011 | Metzger et al. | 705/7.34 |
| 2011/0313884 A1* | 12/2011 | Eze | 705/26.41 |
| 2012/0005070 A1* | 1/2012 | McFall et al. | 705/38 |
| 2012/0054049 A1* | 3/2012 | Hayes | 705/21 |
| 2012/0072336 A1* | 3/2012 | Le Vine et al. | 705/38 |
| 2012/0109815 A1* | 5/2012 | Peterson et al. | 705/38 |
| 2012/0284173 A1* | 11/2012 | Monjanel et al. | 705/38 |
| 2013/0238487 A1* | 9/2013 | Biske | G06Q 40/02 705/39 |
| 2013/0317860 A1* | 11/2013 | Schumann, Jr. | G06Q 40/08 705/4 |

* cited by examiner

US 10,062,117 B2

PROVIDING LOAN SERVICES IN THE EVENT OF A TOTAL LOSS CLAIM

TECHNICAL FIELD

The present invention relates generally to systems and methods for providing loan services to a customer and more specifically to automatically prequalifying a consumer for a loan to replace lost property.

BACKGROUND

Insurance policies allow consumers to protect against the loss of life or property. For example, a person purchases insurance to cover loss of or damage to his or her automobile. In exchange for the payment of insurance premiums to an insurance provider, the provider agrees to compensate the policy holder in the event a loss or damage to the covered property. In some cases, the insurance provider pays to have the property repaired, such as in the case where an automobile is damaged in an accident. In other cases, the insurance provider determines that the accident results in a total loss. In such cases, the property cannot be economically repaired and the insurance provider compensates the insured for this loss. These insurance claims are terms "total loss claims."

In the event of a total loss, an insured individual likely will need to replace the lost property. For example, following an automobile accident that results in the total loss claim, the insured will likely need to purchase a replacement automobile. Typically, the amount of compensation received from an insurance provider in response to the total loss claim is less than the cost to replace the lost property. For example, a five-year-old automobile may be worth $10,000 while a new automobile of the same make and model may cost $25,000. If the five-year-old automobile suffers a total loss event, the insurance provider would typically pay the customer $10,000, less any applicable deductible. If the customer wants to replace the lost property with a new car, he or she would need $15,000 more to pay for the new car. Often, a customer would take out a loan to pay this difference. Insurance providers are positioned to provide loan services to the insured in the event of a total loss claim. In response to servicing the claim, the insurance provider can offer the customer loan products that can be used to replace the lost property. Such a loan is referred to herein as a property replacement loan. Given that a customer may need to replace the property as soon as possible, how quickly a loan offer can be provided to the customer is critical in securing that loan business. One initial step in many loan processes is to pre-approve or prequalify a customer for a certain loan. This prequalification uses limited data on the customer to determine, based on the customer's credit worthiness, if the customer would likely qualify for a specific loan product.

In order to provide loan prequalification and loan offers to a customer in response to a total loss event, an insurance provider may have a relationship with one or more financial institutions. In one case, the financial institution may be part of a larger company that includes both an insurance provider and a financial institution. This case may include the situation were a financial institution owns an insurance provider subsidiary or vice versa. In a second case, the insurance provider may have a business relationship with one or more financial institutions that are independent of the insurance provider, where the business relationship includes the financial institution providing loans to customer's of the insurance provider that have suffered a total loss event. In a third case, a financial institution may establish a relationship with one or more insurance providers for the purpose of receiving indications of total loss events so as to pursue those loan opportunities.

Even if the customer has already secured a loan to replace the property, the insurance provider may still want to offer a property replacement loan to the customer. That is, the offered loan may provide more favorable terms than the property replacement loan secured by the customer, such that the customer would take the new loan offer and pay off the loan previously obtained by the customer. For example, the customer could have secured financing for a new car through an automobile dealership where the customer purchased a replacement vehicle after a total loss event. The customer could still benefit from a loan with better financial terms, such that the customer would refinance the vehicle loan.

What is needed is an automated system and method for providing loan services to an insurance customer in the event of a total loss claim, including automating the prequalification process for a property replacement loan. By automating the process, the system and method achieve one of the goals of this solution—to quickly provide a pre-approved loan offer to a customer following a total loss event.

SUMMARY OF THE INVENTION

The present invention includes systems and methods for automatically providing loan services to an insurance provider customer in the event of a total loss claim. In one aspect of the present invention, a computer-based method for automatically providing a loan offer to a customer is provided. In this method, one or more computers perform the steps of: 1) receiving at the computer an indication of a total loss event for a customer's property; 2) collecting prequalification data for a customer from a data source comprising customer-specific data; 3) prequalifying the customer for a property replacement loan based on the collected prequalification data and further based on data associated with the customer's credit; 4) providing a customer an offer for the property replacement loan; and 5) reporting a status of the loan offer.

In another aspect of the present invention, a computer-based system for automatically providing a loan offer to a customer is provided. The system includes a total loss claim loan offer module programmed to: 1) receive an indication of a total loss event for a customer's property from an insurance processing computer; 2) collect prequalification data for a customer from a data source comprising customer-specific data resident on the insurance processing computer; 3) prequalify the customer for a property replacement loan based on the collected prequalification data and further based on data associated with the customer's credit; 4) provide a customer an offer for the property replacement loan; and 5) report a status of the loan offer to a computer associated with a financial institution.

In yet another aspect of the present invention, a computer-based method for automatically providing a loan offer to a customer is provided. In this method, one or more computers perform the steps of: 1) receiving at a computer an indication of a total loss event for a customer's property; 2) querying, by the computer, a data source comprising customer-specific data to collect prequalification data for a customer; 3) receiving, at the computer in response to the query, the customer-specific data; 4) determining, by the computer, if the customer has elected privacy options that would prevent the use of the customer-specific data to provide the loan offer; 5) determining, by the computer, if the customer-specific data includes at least one piece of data that can be used to perform a credit check; 6) submitting, by the computer, the collected prequalification data to a credit bureau computer; 7) receiving, by the computer from the credit bureau computer, a result of a credit evaluation; 8) determining if the customer prequalifies for a property replacement loan; 9) providing, by the computer, the customer an offer for the property replacement loan; and 10) reporting, by a computer, a status of the loan offer.

DETAILED DESCRIPTION OF EXEMPLARY EMBODIMENTS

The exemplary embodiments of the present invention provide systems and methods for providing an insurance customer automated loan services in the event of a total loss claim. More specifically, the present invention provide systems and methods for automatically delivering property replacement loan leads to an insurance provider representative or property replacement loan offers to an insurance provider customer. The description below provides exemplary embodiments of the present invention. Most of the descriptions use an automobile as an example of a consumer's property subjected to a total loss event. The present invention is not limited to automobile total loss events but is applicable to other insured property, such as motorcycles, boats, recreational vehicles, homes, or other similar insured property.

Figure 1:
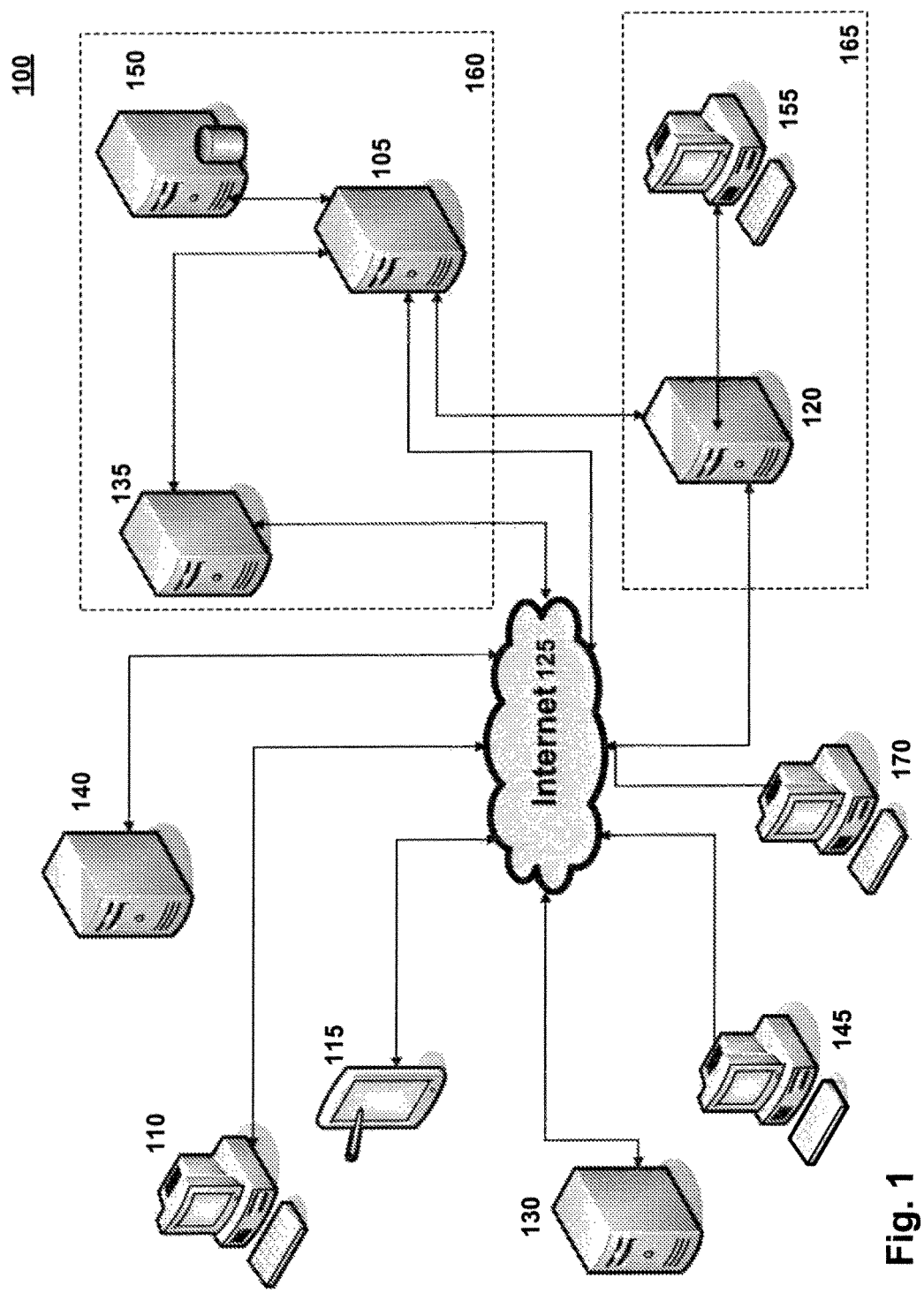
FIG. 1 provides a diagram depicting a computer network in accordance with an exemplary embodiment of the present invention.

FIG. 1 depicts a computer network 100 in accordance with an exemplary embodiment of the present invention. Referring to FIG. 1, a loan offer computer 105 is connected to additional computing devices over a local area network (LAN), virtual private network (VPN), or wide area network (WAN), such as the Internet 125. The loan offer computer 105 automates a process for providing a property replacement loan offer to a customer in the event of a total loss of the customer's property. In this exemplary embodiment, the loan offer computer 105 is part of a financial institution's computer network 160, where the financial institution provides the property replacement loan. In this embodiment, the financial institution may have a corporate relationship with the insurance provider that provided insurance coverage for the loss property and, in that case, the financial institution's computer network 160 is connected to an insurance provider's computer network 165. In an alternative embodiment, the financial institution and insurance provider are not related companies. In this alternative embodiment, the financial institution's computer network 160 is connected to an insurance provider's computer network 165 over an external connection, such as the Internet 125.

The loan offer computer 105 is connected to an insurance processing computer 120, which performs computer-based operations for the insurance provider. The loan offer computer 105 is capable of receiving an indication from the insurance processing computer 120 when a total loss event has occurred. The insurance processing computer 120 is connected to a claims computer 110, which is part of a property claims system. For example, the claims computer 110 may be operated by a claims adjuster for an insurance provider or a vendor of an insurance provider, such as an auto body shop, who provides an estimate of the damages to a customer's property, such as an automobile. The claims computer 110 sends information on the customer's property over the Internet 125 to the insurance processing computer 120. This information may include an assessment of whether the damage to the property constitutes a total loss. Alternatively, the claims computer 110 sends may be connected to the insurance processing computer 120 over a LAN or VPN. Similarly, an insurance adjuster may use a mobile computing device, such as a tablet 115, smartphone (not shown), laptop computer (not shown), or other mobile computing device. These devices, such as the tablet 115, may connect, through a wireless network or cellular-based telephony network, to the insurance processing computer 120 through the Internet 125. Through this connection, an adjuster sends information to the insurance processing computer 120 on the condition of a customer's property.

The insurance processing computer 120 includes computer-based processes in addition to insurance claims processing, such as a client register, which includes data on customers of the insurance provider; an associate register, which includes information on insurance provider agents; an activity management process, which allows agents to manage specific opportunities to provide services to customers; and a marketing direct mail module, which sends information to customers or potential customers in the form of mail by way of the postal service or electronic mail over the Internet 125. The insurance processing computer 120 may be one or more computers connected over a network, such as a LAN, WAN, or VPN. These one or more computers may operate on similar or disparate software platforms. The insurance processing computer 120 is connected to multiple work stations 155. This configuration allows insurance provider representatives, such as customer service representatives and insurance agents, to access the processes on the insurance processing computer 120. The insurance processing computer 120 is connected to the work stations 155 over a network, such as a LAN (e.g., insurance provider's computer network 165), WAN (such as the Internet 125), or VPN.

The loan offer computer 105 is also connected to a credit bureau computer 130, which performs consumer credit-related services. For example, the computer 130 may be operated by a credit bureau, such as TRANSUNION®, EXPERIAN®, or EQUIFAX®. A credit bureau collects and aggregates information related to a consumer's credit activity, such as payment history, debts, and court records.

Typically, these credit bureaus calculate a credit score for a consumer based on the collected and aggregated data. The credit score, derived from an algorithm employed by the credit bureau, reflects the relative credit-worthiness of the consumer. Companies, such as financial institutions, can, for a fee, access a consumer's credit score and other credit data from the credit bureau.

The loan offer computer 105 is also connected to a bank loan center computer 135, which is associated with the financial institution that ultimately will provide loan services to the insurance provider's customer that suffered a total loss event. The computer 105 may be connected to the bank loan center computer 135 over a WAN, such as the Internet 125, a LAN, or a VPN. Typically, the loan offer computer 105 would be connected to the bank loan center computer 135 over a LAN or a VPN when the insurance provider and financial institution are part of the same company.

The loan offer computer 105 is also connected to a loan application processing computer 140, which maintains an Automated Credit Application Processing System (ACAPS). The ACAPS receives and stores information for prequalified customers to facilitate the final loan application process. The ACAPS may be managed by an independent entity, that is, an entity independent of the financial institution and insurance provider. Alternatively, the ACAPS may be part of the financial institution and may reside on computer 135 or be part of the financial institution's computer network 160.

The loan offer computer 105 is also connected to a computer 145, which is operated by a consumer, such as a customer of the insurance provider. The customer can access certain functionality of the loan offer computer 105 over a network, such as the Internet 125. Typically, access would be through a portal on the World Wide Web and the personal computer 145 would include a browser software program for accessing the loan offer computer 105. Alternatively, the personal computer 145 may have a client software program used to access the loan offer computer 105. Further, a customer can use the personal computer 145 to report a claim to the insurance processing computer 120 in the event of an accident, where such a claim may ultimately be classified as a total loss event. Alternatively, the customer can access the loan offer computer 105 or insurance processing computer 120 using a mobile device (not shown) or by contacting his or her agent or a call center for the insurance provider.

The loan offer computer 105 is also connected to a bank pre-approval and prequalification database server 150, which contains information about the customer's property replacement loan process. For example, this database 150 includes personal identifying information for the customer, information from the credit bureau, information about the customer's insurance agent, and the status of the replacement loan offer. Typically, the database records for a customer would be associated with a unique customer ID.

The loan offer computer 105 is also connected to an agent computer 170. The agent computer 170 is operated by an agent of the insurance provider, who may be an independent contractor of the insurance provider. In this exemplary embodiment, the agent computer 170 is connected to the loan offer computer 105 over the Internet 125. The agent computer 170 may interact with the loan offer computer 105 through the insurance processing computer 120.

Figure 2:
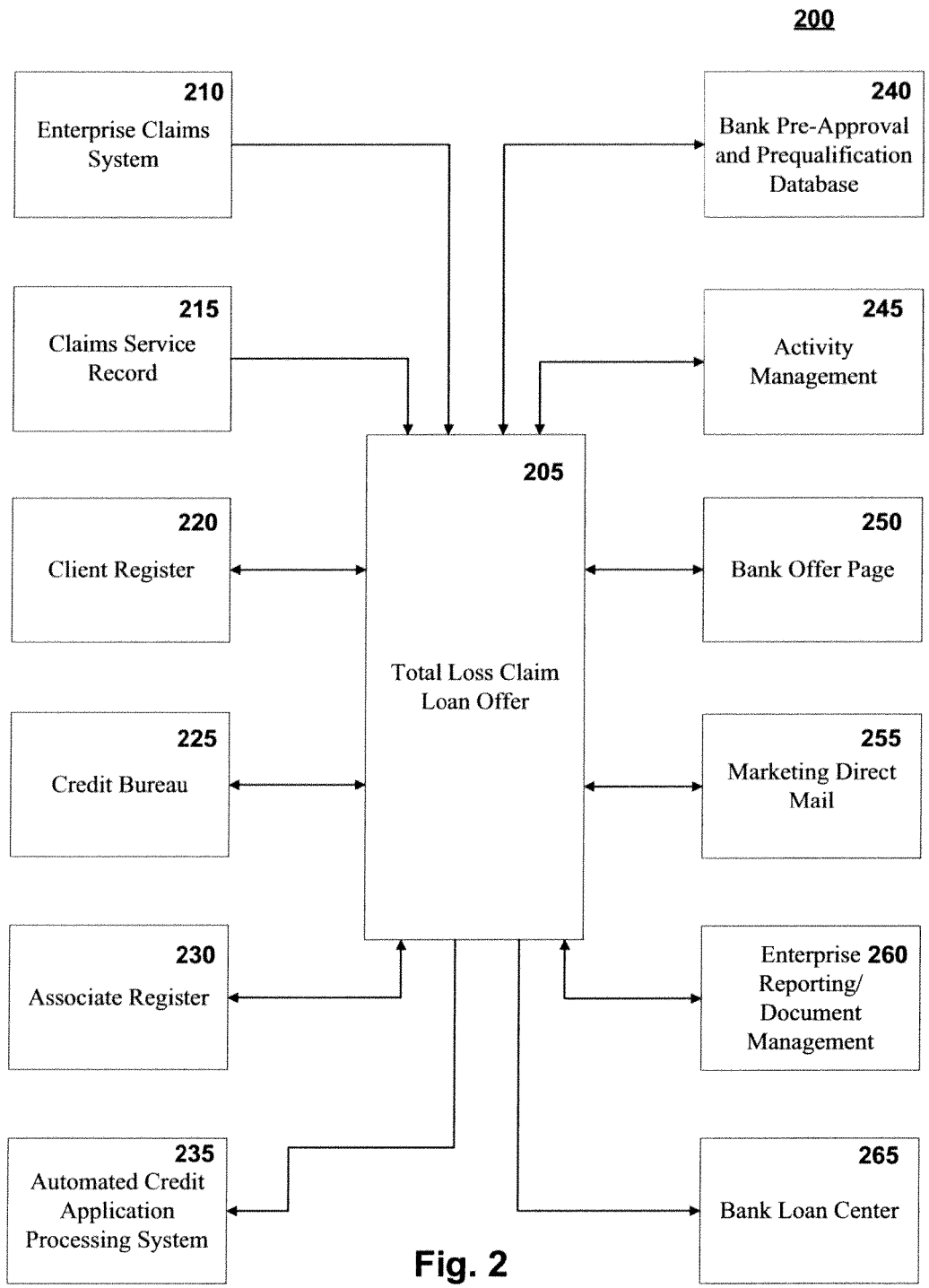
FIG. 2 provides a diagram depicting a software architecture in accordance with an exemplary embodiment of the present invention FIG. 3 provides a flow diagram depicting the process flow for providing loan services in the event of a total loss claim in accordance with an exemplary embodiment of the present invention.

FIG. 2 provides a diagram depicting a software architecture 200 in accordance with an exemplary embodiment of the present invention. Referring to FIGS. 1 and 2, a total loss claim loan offer module 205 interacts with other software modules to prequalify a customer for a loan that can be used to replace property lost in a total loss event, such as an automobile totaled in an accident. The total loss claim loan offer module 205 receives an indication from an enterprise claims system 210 or a claims service record 215 that a total loss event has occurred. This indication of a total loss event triggers the property replacement loan prequalification process.

The total loss claim loan offer module 205 exchanges information with a client register 220. The client register 220 includes specific information associated with a customer of the insurance provider. Typically, customer data would be maintained and associated with a unique customer identifier (ID). Data may include specifics about insured property, personal identifying information (name, address, phone number, email address, social security number, and the like), and privacy preferences. For example, the data may indicate whether a customer has indicated a preference not to share his or her data with other entities or has indicated a preference not to be solicited with offers of other products or services. The client register 220 resides on the insurance processing computer 120.

The total loss claim loan offer module 205 also exchanges information with a credit bureau module 225. The credit bureau module 225 is maintained and operated by a third-party commercial credit bureau and resides on the credit bureau computer 130. Typically, the credit bureau module 225 would include the capability to interact with computer-based systems of entities that use the credit bureau's services, such as an insurance provider or financial institution.

The total loss claim loan offer module 205 also exchanges information with an associate register 230. The associate register 230, which resides on the insurance processing computer 120, includes information about agents for the insurance provider. Insurance agents may represent a single insurance provider or multiple insurance providers. The associate register 200 includes information on these agents such as contact information and customers.

The total loss claim loan offer module 205 also provides information to an automated credit application processing system (ACAPS) 235. The automated credit application processing system 235, which may reside on the loan application processing computer 140, receives files for each customer that is prequalified for a property replacement loan. The ACAPS stores this provided information to facilitate the final loan application process should the customer elect to pursue the offered property replacement loan. Information may be provided to the ACAPS through an integrated loan application (ILA) system, which may be interfaced by agents of the insurance provider or financial institution to provide certain customer information.

The total loss claim loan offer module 205 interacts with a bank pre-approval and prequalification database 240. The bank pre-approval and prequalification database 240, which resides on the bank pre-approval and prequalification database server 150, includes information about each property replacement loan offer, including data on customer, the customer's agent, and the status of the loan offer.

The total loss claim loan offer module 205 interacts with an activity management module 245. The activity management module 245, which resides on the insurance processing computer 120, allows agents of the insurance provider whose customer suffered the total loss event to manage their interactions with customers. The activity management module 245 informs the agent of possible leads for a certain customer and triggers actions related to a specific customer, for example, informing the agent of the imminent expiration of a customer's insurance policy. The activity management module 245 also notifies the agent that a customer is prequalified for a property replacement loan in the event of a total loss event. In an alternative embodiment, such as where the insurance provider is a subsidiary of the financial institution providing the loan offer or has been contracted by the financial institution to provide an indication of a total loss event, the activity management module 245 may be used by a representative of the financial institution.

The total loss claim loan offer module 205 interacts with a bank offer page 250. The bank offer page 250, which resides on the loan offer computer 105, allows an agent to manage a specific customer's loan offer. The bank offer page 250 can be accessed from a hypertext transfer protocol (HTTP) link provided by the activity management module 245. The bank offer page 250 allows the agent to extract specific information about a loan offer and update loan offer information. These updates are provided to the total loss claim loan offer module 205, which then updates the bank pre-approval and prequalification database 240 with the new information. In an alternative embodiment, a customer may view and interact with the bank offer page 250 by accessing the bank offer page 250 with the customer's computer 145 over the Internet 125.

The total loss claim loan offer module 205 interacts with a marketing direct mail module 255. The marketing direct mail module 255, which resides on the insurance processing computer 120, facilitates the mass mailing of information to insurance provider customers. These mailings may be either mail delivered by the postal service or electronic mail (or both). For property replacement loan offers, the marketing direct mail module 255 receives data related to a prequalified customer and generates a prequalification letter be sent to a customer. The marketing direct mail module 255 may send letters in a batch-wise fashion at specific periods of time, such as weekly or daily.

The total loss claim loan offer module 205 interacts with an enterprise reporting/document management module 260. The enterprise reporting/document management module 260 receives periodic reports from the total loss claim loan offer module 205 regarding total loss events. The enterprise reporting/document management module 260 provides the total loss claim loan offer module 205 with reports regarding loan offer activity, including business partner activities. Example reports may include customer contacts and loan offers made, perhaps broken up into geographical regions, such as prequalified loan offers by state.

The total loss claim loan offer module 205 sends information to a bank loan center module 265. The bank loan center module 265, which resides on the bank loan center computer 135, ultimately processes loans. Periodically, such as on a daily or weekly basis, the total loss claim loan offer module 205 sends reports to the bank loan center module 265 identifying all prequalified customers.

Figure 3:
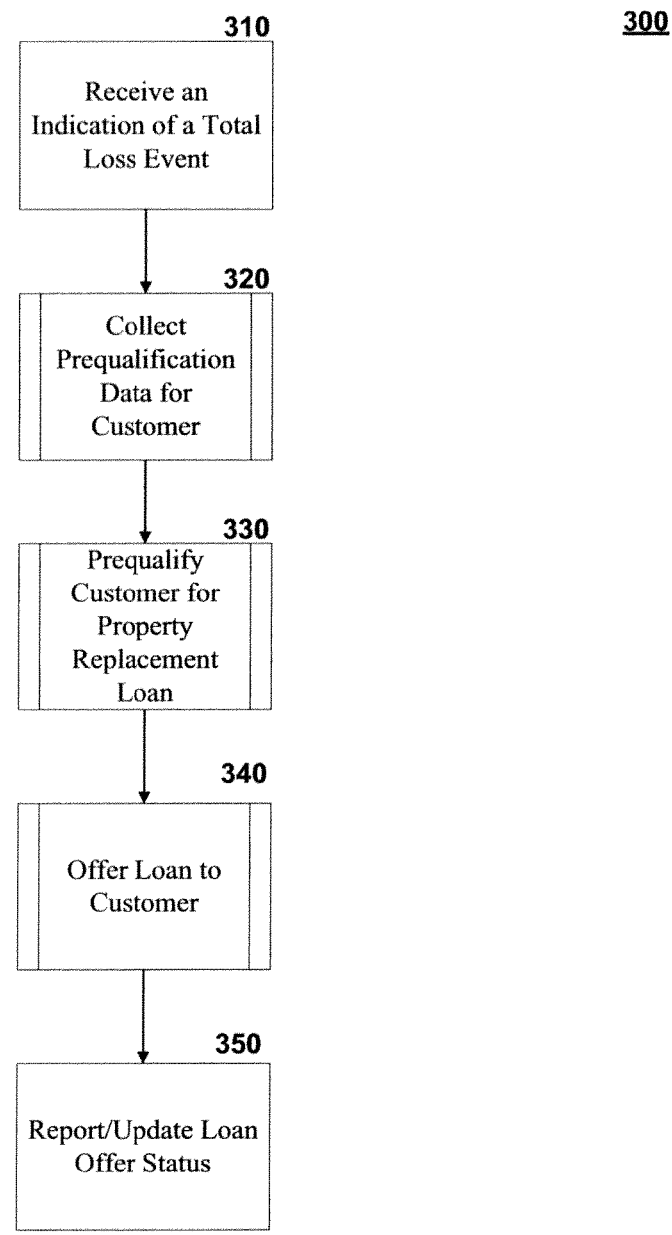

FIG. 3 provides a flow diagram 300 depicting the process flow for providing loan services in the event of a total loss claim in accordance with an exemplary embodiment of the present invention. Referring to FIGS. 2 and 3, the total loss claim loan offer module 205 receives an indication of a total loss claim or event, such as from the enterprise claims system 210 or claims service record 215. A claims representative for the insurance provider or other vendor that supplies services to the insurance provider, such as an auto repair facility, evaluates a customer's property involved in an accident. This evaluation includes an estimate of the amount of damage that the property sustained (for example, the cost to repair the damage). Based on this evaluation, the representative or a process running on the insurance processing computer 120 determines that the accident is a total loss event. Typically, this determination will be based on the estimate of the damage sustained compared to the value of the property. For example, if the cost to repair an automobile after an accident is greater than the value of the automobile, the event will be deemed a total loss event—the car is said to have been "totaled." The results of the evaluation are recorded in the insurance processing computer 120 and this result is available to the total loss claim loan offer module 205 during the process 300. In one embodiment, the insurance processing computer 120, through the enterprise claims system 210, pushes a notification to the total loss claim loan offer module 205, which includes a process to "listen" for such a notification. In an alternative embodiment, the total loss claim loan offer module 205 polls the insurance processing computer 120 for any total loss events. In some cases, the total loss event indication may be an indication that the occurrence is likely a total loss event, such that, a subsequent evaluation could determine that the event did not result in a total loss.

Upon receiving an indication of a total loss event, the total loss claim loan offer module 205 collects prequalification data for the customer that lost property in the total loss event at step 320. This step is described in greater detail below, in connection with FIG. 4.

At step 330, the total loss claim loan offer module 205 prequalifies the customer for a property replacement loan. This step is described in greater detail below, in connection with FIG. 5. If the customer is prequalified for a property replacement loan, the customer is offered the loan at step 240. This step is described in greater detail below, in connection with FIG. 6. At step 350, the total loss claim loan offer module 205 reports and/or updates the status of the property replacement loan.

Figure 4:
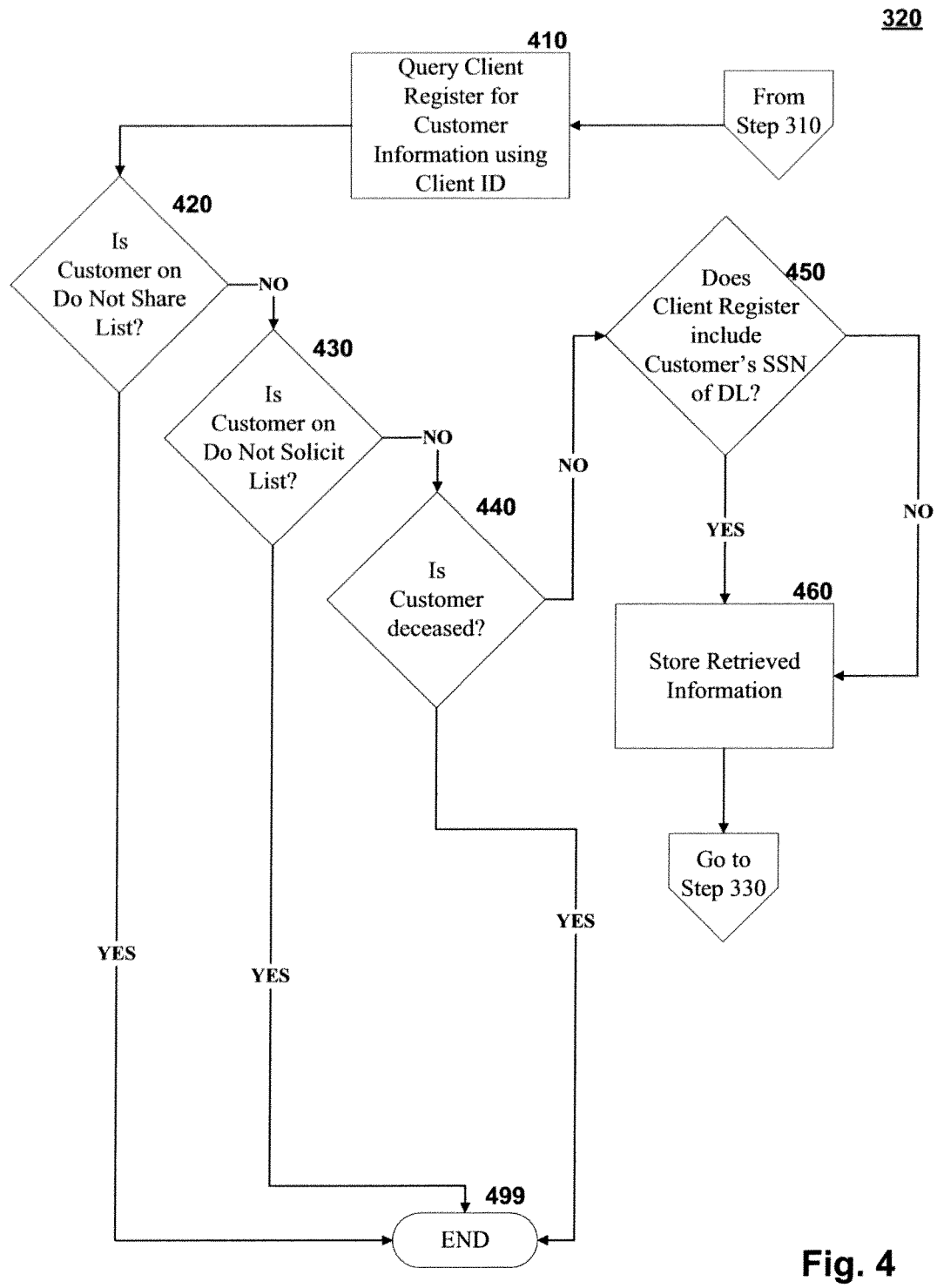
FIG. 4 provides a flow diagram depicting the process flow for collecting prequalification data for a customer in accordance with an exemplary embodiment of the present invention.

FIG. 4 provides a flow diagram 320 depicting the process flow for collecting prequalification data for a customer in accordance with an exemplary embodiment of the present invention. Referring to FIGS. 2, 3, and 4, at step 410, the total loss claim loan offer module 205 queries the client register 220 for customer information. The indication of a total loss claim received by the total loss claim loan offer module 205 at step 310 includes a unique customer ID associated with the claim. While an insurance claim record associated with the total loss event may have personal identifying information about the customer, such as a social security number, in this exemplary embodiment, only the unique customer ID is transferred from the claim record to the total loss claim loan offer module 205 as part of the indication of a total loss event received at step 310. The query at step 410 uses that customer ID to extract specific information about the customer to be used in the prequalification process. Such information may include personal identifying information for the customer, such as a social security number and driver's license number, the nature of the covered property, any privacy preferences for the customer, and whether the customer is deceased. For some total loss events, such as a serious automobile accident, the property owner could be killed in the accident. The client register 220 would include such information.

At step 420, the total loss claim loan offer module 205 determines if the customer's privacy preferences include an indication not to share the customer's personal information. The insurance provider's privacy policy may allow a customer to indicate that he or she does not want any personal information shared with the insurance provider's business partners. If the result of the determination at step 420 is "YES," the process 320 moves to step 499 and ends. In this event, the prequalification process is terminated.

If the result of the determination at step 420 is "NO," the process 320 moves to step 430, where the total loss claim loan offer module 205 determines if the customer's privacy preferences include an indication not to be solicited for other products or services provided by the insurance provider. The insurance provider's privacy policy may allow a customer to indicate that he or she does not want solicitations for other products or services administered by the insurance provider. If the result of the determination at step 430 is "YES," the process 320 moves to step 499 and ends. In this event, the prequalification process is terminated.

If the result of the determination at step 430 is "NO," the process 320 moves to step 440, where the total loss claim loan offer module 205 determines if the customer is deceased. Since some total loss events, such as serious automobile accidents, could result in the death of the customer, the insurance provider wants to ensure that it does not provide any solicitation under such circumstances. If the result of the determination at step 440 is "YES," the process 320 moves to step 499 and ends. In this event, the prequalification process is terminated.

If the result of the determination at step 440 is "NO," the process 320 moves to step 450, where the total loss claim loan offer module 205 determines if the client register 220 includes the customer's social security number or driver's license number. A customer's social security number or driver's license number is often supplied to a credit bureau to perform a credit check, which is a determination of the credit worthiness of an individual. Regardless, of the result of this inquiry, the process 320 moves to step 460, where the total loss claim loan offer module 205 stores retrieved information and moves to step 330. In the event that the client register 220 did not have the customer's social security number or other specific identification number, such as a driver's license number, the total loss claim loan offer module 205 can continue with the prequalification process. However, the quality of the prequalification results may be impacted if the total loss claim loan offer module 205 cannot associate the results of subsequent processing steps with the specific customer.

Figure 5:
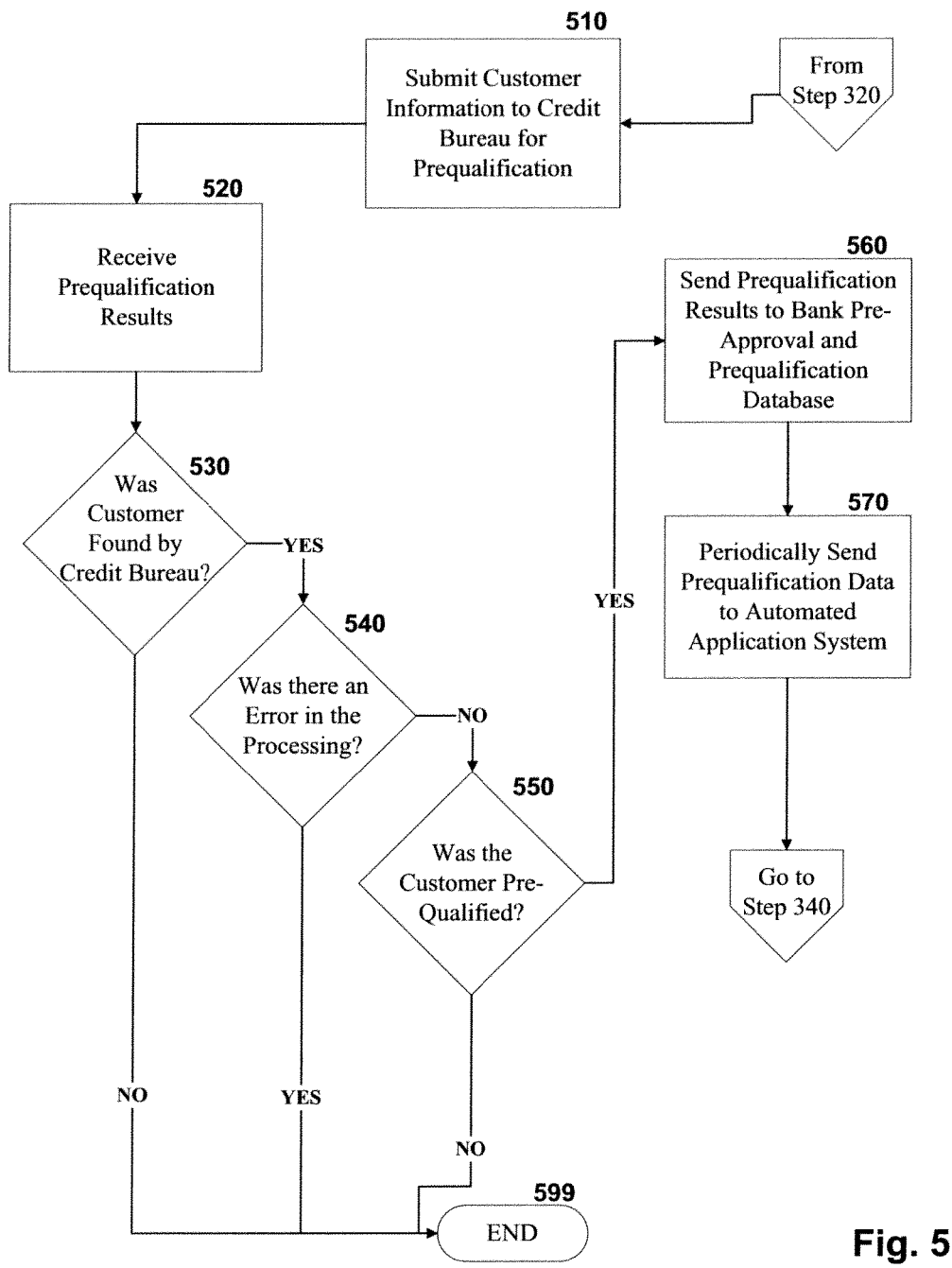
FIG. 5 provides a flow diagram depicting the process flow for prequalifying a customer for a property replacement loan in accordance with an exemplary embodiment of the present invention.

FIG. 5 provides a flow diagram depicting the process flow 330 for prequalifying a customer for a replacement loan in accordance with an exemplary embodiment of the present invention. Referring to FIGS. 2, 3, 4, and 5, at step 510, the total loss claim loan offer module 205 submits customer information stored at step 460 to the credit bureau module 225. The credit bureau module 225 uses the submitted information to provide a prequalification result. In one embodiment, this result is a credit score that is returned to the total loss claim loan offer module 205 at step 520. In an alternate embodiment, this result is a determination as to whether the customer is prequalified for the loan. In this latter embodiment, the information supplied to the credit bureau at step 510 would include loan terms, such as loan amount, interest rate, and duration.

In one embodiment, the replacement property loan amount for which the customer is prequalified may be a set amount. For example, in the case of a total loss event involving an automobile, each prequalification would be for a property replacement loan of a set amount, such as $25,000. The set amount could be based on the average price of a new automobile. In an alternative embodiment, the loan amount may be based on the lost property. For example, in the case of a total loss event involving an automobile, the prequalification would be for the amount of money to purchase a new automobile of the same (or comparable) make and model as the automobile involved in the total loss event (perhaps less the amount that the customer will receive for the value of the totaled car). In another alternative embodiment, the prequalification step could set a maximum value for which the customer is prequalified. For certain total loss events, a variety of loan terms may be used to develop multiple prequalifications. For example, in the case where a home is the property lost in the total loss event, the property replacement loan terms may include loans for different durations (15 years and 30 years, for example) and different interest rate scenarios (fixed rate or adjustable rate, for example).

At step 530, the total loss claim loan offer module 205 determines if the customer was found by the credit bureau module 225. If the result of the determination at step 530 is "NO," the process 330 moves to step 599 and ends. In this event, the prequalification process is terminated. In an alternative embodiment, the process 330 returns to step 510 and the total loss claim loan offer module 205 submits the customer information to a different credit bureau.

If the result of the determination at step 530 is "YES," the process 330 moves to step 540, where the total loss claim loan offer module 205 determines if the credit bureau module 225 encountered an error in processing the prequalification request. If the result of the determination at step 540 is "YES," the process 330 moves to step 599 and ends. In this event, the prequalification process is terminated. In an alternative embodiment, the process 330 returns to step 510 and the total loss claim loan offer module 205 submits the customer information to a different credit bureau.

If the result of the determination at step 540 is "NO," the process 330 moves to step 550, where the total loss claim loan offer module 205 determines if the customer prequalifies for the property replacement loan. This determination may be based on a determination made by the credit bureau module 225 or based on an analysis by the total loss claim loan offer module 205, which would use information returned at step 520, such as a credit score, and other information, such as loan terms, to determine if the customer prequalifies for the property replacement loan. Loan terms and the customer's information and credit score (and/or other credit data) may be used in an algorithm that is part of the claim loan offer module 205 to determine if the customer qualifies for the specific loan. Alternatively, the algorithm may determine, based on the customer's data and credit score (and/or other credit data), the loan terms for which the customer qualifies.

If the result of the determination at step 550 is "NO," the process 330 moves to step 599 and ends. In this event, the prequalification process is terminated. In an alternative embodiment, the process 330 returns to step 510 and the total loss claim loan offer module 205 submits the customer information to a different credit bureau.

The above-described process employs a single credit bureau or, in an alternative embodiment, multiple credit bureaus accessed in series. In yet another alternative embodiment, at step 510, the total loss claim loan offer module 205 could send the customer information to multiple credit bureaus in parallel. In this alternative embodiment, the ultimate determination at step 550 would be based on results returned at step 520 from all of the credit bureaus.

If the result of the determination at step 550 is "YES," the process 330 moves to step 560, where the total loss claim loan offer module 205 sends the prequalification results to the bank pre-approval and prequalification database 240.

The prequalification results would be associated with a unique customer ID for the customer that suffered the total loss event.

At step 570, the total loss claim loan offer module 205 periodically sends the prequalification data to the automated credit application processing system (ACAPS) 235. For example, on a daily or weekly basis, the total loss claim loan offer module 205 would send the prequalification data to ACAPS 235 for all prequalified customers since the previous communication with the ACAPS 235. The data is used to automatically populate a loan application for the customer.

Figure 6:
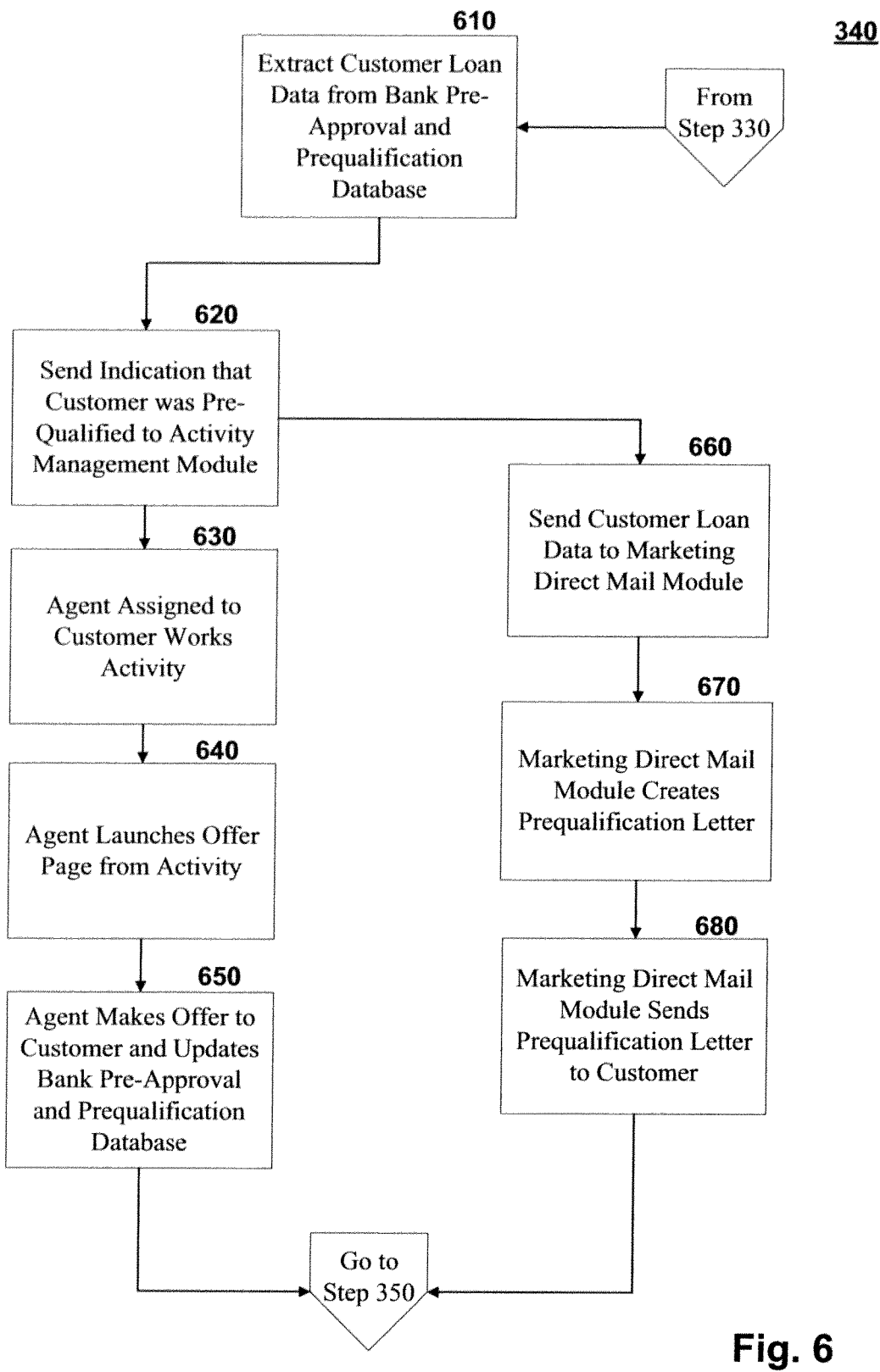
FIG. 6 provides a flow diagram depicting the process flow for offering a customer a property replacement loan in accordance with an exemplary embodiment of the present invention.

FIG. 6 provides a flow diagram depicting the process flow 340 for offering a customer a replacement loan in accordance with an exemplary embodiment of the present invention. Referring to FIGS. 2, 3, 5, and 6, at step 610, the total loss claim loan offer module 205 extracts customer loan data from the bank pre-approval and prequalification database 240. The prequalification results would be associated with a unique customer ID for the customer that suffered the total loss event.

At step 620, the total loss claim loan offer module 205 sends an indication that the customer was prequalified for a property replacement loan to the activity management module 245. Typically, the claims processing aspect of the insurance provider, that is, the group processing the claim associated with the total loss event, would not be informed of the results of the prequalification. At step 630, an agent or other provider representative assigned to the customer receives a work activity from the activity management module 245 associated with the prequalification. Typically, an agent would routinely log into the activity management module 245. The activity management module 245 would push activities to the agent's user interface, such as a personal computer screen or tablet computer. The agent would then perform the activity. The activity management module 245 serves as a way for an insurance provider to manage the work flow of certain tasks.

At step 640, the agent launches an offer page associated with the property replacement loan for the prequalified customer. For example, the activity management module 245, which may be accessed with a browser program, may provide an HTTP link that the agent can actuate to open a web page with a browser. With this page, the agent can view and provide input related to the property replacement loan offer.

At step 650, the agent provides the offer to the customer and updates the bank pre-approval and prequalification database 240. This step may be accomplished by initiating an email to the customer. The email may have a link to allow the customer access to the loan offer page (or similar page). Alternatively, the agent could call the customer. In another alternative, the agent can refer the offer to a call center, where a customer service representative places the call that provides the offer to the customer. In yet another alternative, the total loss claim loan offer module 205 could automatically send the offer to the customer without the agent taking any action.

In some cases, the customer may have already secured a loan. In those cases, the offered loan would be treated as a refinancing loan. The agent (or total loss claim loan offer module 205, though direct input from the customer accessing a loan offer page using the personal computer 145) would receive information on the terms of the loan already secured by the customer. In some cases, if the loan already secured by the customer has terms more favorable to the customer than the loan offered at step 650, the process 300 may return to step 330 to determine if the customer could be prequalified for a loan with more favorable terms than those already secured by the customer.

At step 660, which occurs in parallel to the agent's activities, the total loss claim loan offer module 205 sends customer loan data to the marketing direct mail module 255. At step 670, the marketing direct mail module 255 creates a prequalification letter from the supplied customer loan data. The prequalification letter would inform the customer of the opportunity to receive a property replacement loan and the terms of the loan. Typically, when a credit inquiry is made resulting in a loan offer, that offer must be supplied to the intended recipient in writing. At step 680, the marketing direct mail module 255 causes the prequalification letter to be sent to the customer. The process 340 moves to step 350. The inclusion of this parallel flow of activities ensures that the customer receives a written offer providing the property replacement loan opportunity.

For the purposes of this disclosure, the term exemplary means example only. Although the disclosed embodiments are described in detail in the present disclosure, it should be understood that various changes, substitutions and alterations can be made to the embodiments without departing from their spirit and scope.

What is claimed is:

1. A computer-based method for automatically providing a loan offer to a customer comprising the steps of:
   receiving, by a loan offer computer over a network connection from an application executed by an insurance processing computing device associated with an agent of the customer, an indication of a total loss event for a customer's property insured by an insurance policy;
      wherein the loan offer computer is associated with a financial institution computer network that offers loan services; and
      wherein the insurance processing computing device is associated with the agent of the customer and is in communication with a computer network of an insurance provider that provides the insurance policy;
      wherein the loan offer computer is connected via the network connection to the insurance processing computing device so that the financial institution computer network is thereby connected to the insurance provider computer network;
   extracting, by the loan offer computer, customer loan data from a data source residing on the insurance processing computing device for customer-specific prequalification data regarding the customer;
   determining, by the loan offer computer, based on the customer-specific prequalification data regarding the customer, whether the customer has elected privacy options that would prevent the use of the customer-specific prequalification data for determining whether to provide the loan offer;
   determining, by the loan offer computer, whether the customer-specific data prequalification includes at least one piece of data that is usable by a credit bureau for performing a credit check;
   transmitting, by the loan offer computer and over an Internet, the customer-specific prequalification data to a credit bureau computer system associated with the credit bureau when both (a) the customer has not elected privacy options that would prevent the use of the customer-specific prequalification data for determining whether to provide the loan offer and (b) the customer-specific data includes at least one piece of data that is usable by the credit bureau for performing a credit check;

receiving, by the loan offer computer from the credit bureau computer system and over the Internet, a result of a credit evaluation regarding the customer's credit;

receiving by the loan offer computer over the Internet a determination from the credit bureau computer system, whether the customer prequalifies for a property replacement loan for replacing the property involved in the total loss event based on the result of the credit evaluation received from the credit bureau computer system; and pushing by the loan offer computer a notification including an offer for the property replacement loan to the insurance processing computing device associated with the agent of the customer, when the customer prequalifies for the property replacement loan.

2. The method of claim 1 wherein the result of the credit evaluation is a credit score.

3. The method of claim 1 wherein the result of the credit evaluation received from the credit bureau computer system comprises a determination by the credit bureau of whether the customer prequalifies for the loan.

4. The method of claim 1 further comprising the steps of:
transmitting, by the loan offer computer and over the Internet to a computer associated with the customer, a computer generated page that indicates the loan offer;

receiving, by the loan offer computer and over the Internet from the computer associated with the customer, a response to the loan offer from the customer; and generating, by the loan offer computer, a prequalification letter; and transmitting, by the loan offer computer and over the Internet to the computer associated with the customer, the prequalification letter after receiving the response to the loan offer.

5. The method of claim 1 wherein the offer for the property replacement loan is an offer for a refinancing loan.

6. The method of claim 1 wherein the step of transmitting, by the loan offer computer, the customer-specific prequalification data to the credit bureau computer system comprises the loan offer computer transmitting the data to a plurality of credit bureau computer systems associated with a plurality of credit bureaus.

7. The method of claim 1 wherein the customer loan data from a data source residing on the insurance processing computing device comprises a replacement value for the customer's property involved in the total loss event, and the method further comprises establishing an amount for the loan based on the replacement value of the customer's property involved in the total loss event.

* * * * *